United States Patent [19]
Leddy

[11] Patent Number: 5,321,505
[45] Date of Patent: Jun. 14, 1994

[54] COMPUTER SCALABLE VISUALIZATION SYSTEM

[75] Inventor: William J. Leddy, Austin, Tex.

[73] Assignee: Microelectronics & Computer Technology Corporation, Austin, Tex.

[21] Appl. No.: 640,141

[22] Filed: Jan. 11, 1991

[51] Int. Cl.$^5$ .............................................. H04N 7/18
[52] U.S. Cl. .................... 348/383; 395/163
[58] Field of Search .............. 340/716, 717, 721, 752, 340/815.27, 718, 719, 798, 799, 801; 358/56, 60, 87, 230, 231, 241, 83, 87; 345/82, 115; 364/400, 578; 395/158, 161, 650

[56] References Cited

U.S. PATENT DOCUMENTS

| | | | |
|---|---|---|---|
| 4,727,367 | 2/1988 | Noda | 340/811 |
| 4,745,404 | 5/1988 | Kallenberg | 340/752 |
| 4,757,441 | 7/1988 | Buckland et al. | 364/200 |
| 4,760,388 | 7/1988 | Tatsumi et al. | 340/717 |
| 4,761,641 | 8/1988 | Schreiber | 340/717 |
| 4,800,376 | 1/1989 | Suga et al. | 340/721 |
| 4,825,201 | 4/1989 | Watanabe et al. | 340/717 |
| 4,833,542 | 5/1989 | Hara et al. | 358/230 |
| 4,845,480 | 7/1989 | Satou | 340/717 |
| 4,859,997 | 8/1989 | Bouron et al. | 340/752 |
| 4,901,155 | 2/1990 | Hara et al. | 358/230 |
| 5,079,636 | 1/1992 | Brody | 358/241 |
| 5,130,794 | 7/1992 | Ritchey | 358/87 |

FOREIGN PATENT DOCUMENTS

WO8403577 9/1984 World Int. Prop. O. .......... 340/784

OTHER PUBLICATIONS

Glassner et al, "Hardware Enhancements for Raster Graphics," NATO ASI series, vol. f17, Fundamental Algorithms for Computer Graphics, 1985, pp. 631-658.

K. Stuart Smith et al, "Experimental Systems Project at MCC," Mar. 1989, MCC Technical Report Number: ACA-ESP-089-89 Mar. 2, 1989.

K. Stuart Smith et al, "A C++ Environmental For Distributed Location Execution," MCC Techincal Report: ACT-ESP-275-90 Sep. 4, 1990.

Guy S. Caldwell, "88K Message Interface Module Design Notes," ESP Technical Memo #46 Oct. 31, 1988.

Primary Examiner—Dale M. Shaw
Assistant Examiner—U. Chauhan
Attorney, Agent, or Firm—Ross, Howison, Clapp & Korn

[57] ABSTRACT

A scalable visualization system includes a plurality of scalable tiles (10) that each comprise a display portion (18) and a processing portion (20). Each of the display portions (18) define a portion of a physical display space. Each of the processing sections defines a processing node in the parallel processing system. The parallel processing system operating on a single node or a plurality of nodes. A message fabric (36) is provided to connect CPU nodes (34) and each of the tiles (10) together. The tiles (10) are scaled by interconnecting them to form the desired display space with each of the display elements (18). As each tile (10) is added to the overall display space, an additional CPU node (34) is also added, such that not only is the display space scaled up from a physical coordinant standpoint, but the processing power is also scaled up. In addition, each of the CPU nodes (34) is operable to update an associated display list (28) that defines the parameters of the display element (18). Dependent upon the portion of the display space occupied by the display element (18), the display list (28) will vary. This is determined by the overall processor configuration that is made up of all the nodes (34) acting as a single parallel processing system.

24 Claims, 3 Drawing Sheets

COMPUTER SCALABLE VISUALIZATION SYSTEM

The U.S. Government has a paid up license of this invention and the right in limited circumstances to require the patent owner to license others on reasonable terms as provided for by the terms of Contract No. MDA972-88-C-0013 awarded by DARPA.

TECHNICAL FIELD OF THE INVENTION

The present invention pertains in general to multiple display systems and, more particularly, to a multiple display system having both a scalable display and a scalable processing system that are tightly coupled.

BACKGROUND OF THE INVENTION

In conventional processing systems, the output device is typically a display for providing a visual representation, in addition to utilizing mass storage for storage of data, etc. When utilizing a display as compared to mass storage, it is desirable to apportion a predetermined amount of the processing time of an associated processor to the task of updating the display. In any type of processing system, this display updating operation can be the "weak link" in the overall operation of the system. This is typically due to the interconnecting scheme between the processing unit and the display or displays.

In one multiple display system, as disclosed in U.S. Pat. No. 4,800,376, issued Jan. 24, 1989 to Suga, et al., a multiple display system is provided that utilizes a plurality of display elements with decoders associated with each of the display elements. However, this system, although utilizing multiple displays or display elements, still utilizes a single data input for providing data to the system, with the data then routed to the various display elements. Therefore, the limiting factor to display updating is the speed of the data that can be input to the overall display system. Since all display data is input through a single data input, the display bandwidth is governed by this data input. The addition of displays requires a higher bandwidth input to maintain the same display update rates.

Another system, that described in U.S. Pat. No. 4,845,480, issued Jul. 4, 1989 to Satou, discloses a system utilizing a frame memory for storing original data with a plurality of display memories for storing image data. Each of the display memories is associated with a display unit for displaying the image represented by the data stored in each of the associated display memories. Image data transferred from the display memory is performed through a programmable data conversion memory such that the data conversion is performed independent of data manipulation of the frame memory. However, even with this type of system, the updating of the display memories is achieved through a single path. Since there is only a single processing center for interfacing with the original data.

Another disadvantage to systems of the prior art is that they are not "scalable". That is, the display size is fixed by the computer manufacturer relative to the processing power. Even though systems, such as that described in the Suga, et al. patent, have provided for expanded display systems, they have still required the same processing power to service and update all of the displays. There is a significant limitation in bandwidth between the processor portion of the system and the display portion since typically only a single data input is provided for the expanded displays.

SUMMARY OF THE INVENTION

The present invention disclosed and claimed herein comprises a scalable visualization system. The system includes a physical display space and a plurality of display elements, each of the display elements associated with a predetermined portion of the physical display space. Each of the display elements is operable to receive display information at a predetermined information rate. A central processing unit is provided for executing instructions with a predetermined processing power to generate the display information for each of the display elements to be displayed in the physical display space. A display controller is associated with each of the display elements for receiving the portion of the display information associated with the display element from the central processing unit. The display information is then transmitted to the associated display element at the predetermined information rate.

In another aspect of the present invention, the display controller for each of the display elements operates at a rate independent of the other display elements. Further, this operation is asynchronous.

In a further aspect of the present invention, each of the display controllers includes a storage element for storing the display information for the associated display element as a display list. The display list defines the parameters required to map the display information into the physical display space through the associated display element. A graphics controller is provided for mapping the display list to the display element. Update circuitry is provided for updating the display list at a rate at least equal to the predetermined and associated information rate.

In a yet further aspect of the present invention, a central processing unit comprises a parallel processing network having a plurality of processing nodes. Each of the display controllers is associated with at least one of the processing nodes, this operating node operable to generate the display information for the associated display controller. The physical display space is scalable by the addition of display elements and associated display controllers such that an increase in the physical display space corresponds to an increase in the amount of display information that is generated by the central processing unit. Further, the processing power of the central processing unit is also scalable such that an increase in the physical display space will result in an increase in the processing power of the system.

In an even further aspect of the present invention, a scalable element is provided for containing the display element and the portion of the central processing unit that operates as a parallel processing system. This portion of the processing system is a processing node that includes a program memory for storing program instructions and a display memory for storing the display list. The processor is operable to execute program instructions stored in the program memory as a single unit or as a part of the parallel processing system. The processor is operable to generate the display information for the associated display element and update the associated display list in the display memory. An interconnection network is provided for interconnecting the processing node to other nodes in the parallel processing network and for being part of an overall message network in the parallel processing system.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
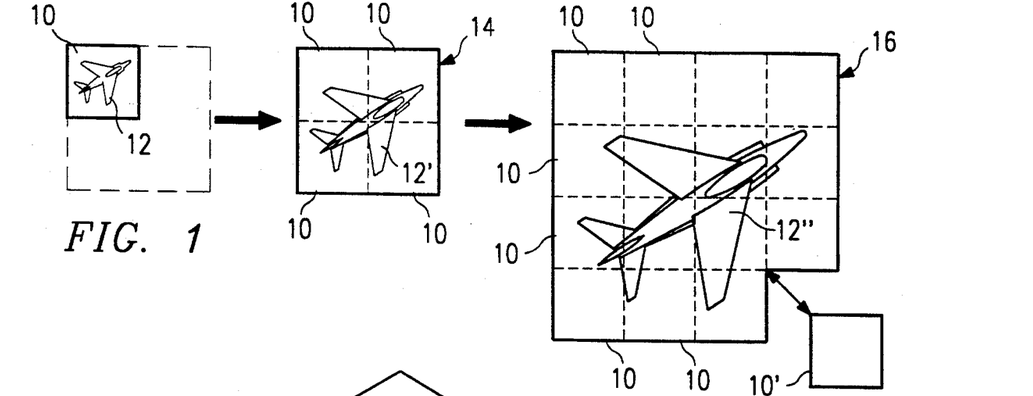
FIG. 1 illustrates a diagrammatic view of the scalable display system of the present invention.

Referring now to FIG. 1, there is illustrated a diagrammatic view of the scalable display system of the present invention. The display system is configured of a plurality of tiles 10 that can be utilized in isolation or can be grouped together to form any configurable physical display space in two dimensions. In the preferred embodiment, the tile 10 is operable to be scaled in an x-y coordinant system. However, it should be understood that any physical display space can be supported by the concept of a single, planar scalable tile. Further, the physical display space could be three dimensional, although it is described in a two-dimensional sense in the present embodiment.

The diagrammatic view of FIG. 1 is illustrated in three sections, illustrating the character of a jet plane in the form of a caricature 12 within a single display tile 10. The tile 10 could be expanded to include four tiles 10 that are combined to form a display 14 that is two tiles in the x-coordinant direction and two tiles in the y-coordinant direction. However, the four tiles 10 that make up the display 14 define the equivalent virtual display space, that of the single tile 10, and containing the caricature 12, but in a larger scaled up physical display space. Therefore, a caricature 12' is displayed on the display 14 occupying the entire physical display space with the exception that it is twice as large as caricature 12 and may have twice as much detail.

In a third configuration, a display 16 is provided that is formed of sixteen tiles 10, the display 16 being four tiles in the x-direction and four tiles in the y-direction. A caricature 12" is formed on the display 16, which is proportionally larger than the caricature 12' on the display 14 and four times larger than the caricature 12 on the single tile 10. Therefore, the sixteen tiles 10 that make up the display 16 define the same virtual display space as display 14 and the single tile 10 but a larger physical display space. One of the tiles 10, designated as tile 10' is illustrated as being separable from the other fifteen tiles 10 in display 16, illustrating that the physical display space can be increased merely by adding additional tiles 10, as will be described in more detail hereinbelow.

Figure 2:
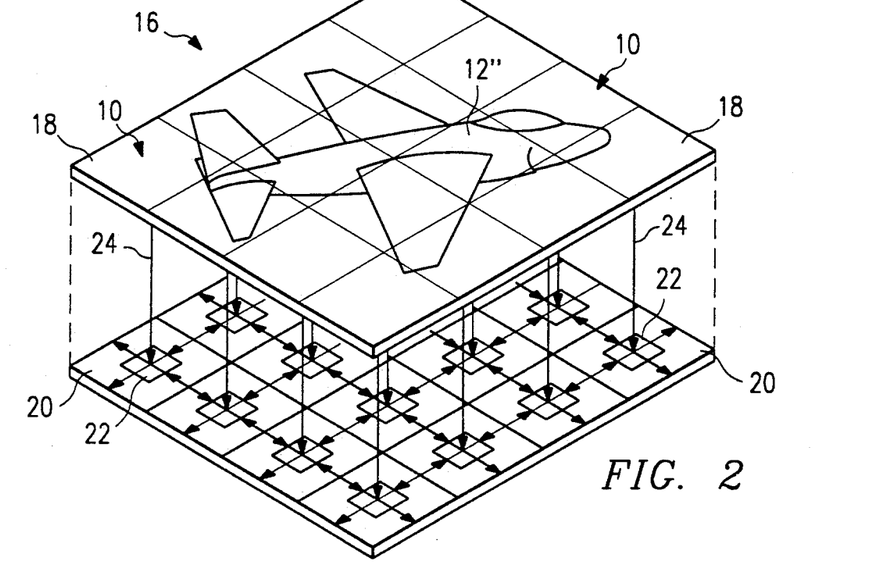
FIG. 2 illustrates an exploded perspective view of the scalable display system and the associated scalable processor portion.

Referring now to FIG. 2, there is illustrated a perspective view of the scalable visualization system of the present invention utilizing the display 16 made up of the sixteen tiles 10. Each of the tiles 10 has associated therewith a display portion 18 and a processing portion 20. The processing portion 20 is disposed on the back of the display 18 and generally comprises a processing node 22 and an interconnection system. The processing node 22 on each of the tiles 10 has a dedicated display interconnection 24 between the processing node 22 and its associated display 18. Therefore, each time a new tile 10 is added to the system, not only is the size of the display scaled up, but the computing power associated with the overall display is also scaled up. The virtual display space has remained the same, even though the physical display space has increased, with the added benefit that the computing power has been scaled up. Additionally, increasing the physical display size does not result in a reduction in display bandwidth, since each of the tiles 10 has associated therewith the tightly coupled display interconnection 24 between the processing node 22 and display 18 associated with each of the tiles 10. Rather, the display bandwidth is scaled up. As will be described hereinbelow, each of the processing nodes 22 for each of the tiles 10 operate in a network through a message fabric and essentially operate as nodes in an overall parallel processing system. However, as compared to previous processing systems, there are multiple display outputs to drive portions of the display and, therefore, update portions of the associated display space with the increased display bandwidth to allow more information to be output by the system.

Figure 3:
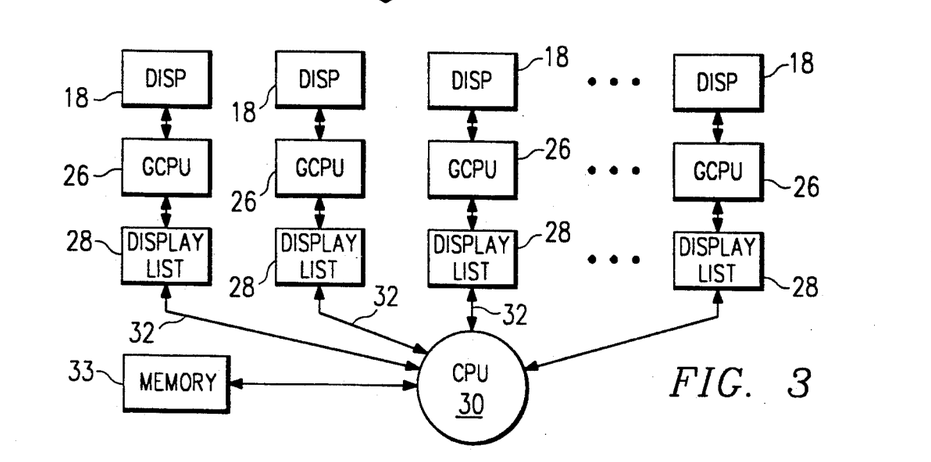
FIG. 3 illustrates a block diagram of the scalable visualization system of the present invention.

Referring now to FIG. 3, there is illustrated a block diagram of the scalable visualization system of the present invention. When the system is configured, a plurality of display elements 18 are defined, with each of the display elements 18 defining a portion of a physical display space. As described above, the physical display space in the preferred embodiment defines an x-y coordinant system. However, this physical display space could define any portion of a display space, either two-dimensional or three-dimensional, or even one-dimensional. For example, each display element 18 could represent a square or rectangular portion of a physical display space. It could also be octagonal in shape. Further, it could represent a portion of a three-dimensional space in the form of a cube or some complex polygon. In any event, each of the display elements 18 can be combined to provide a visual output that would sum up to define the overall physical display space.

Each of the display elements 18 is driven by a graphics central processing unit (GCPU 26) that is generally a central processing unit dedicated solely to updating the display from a data memory 28 that stores what is referred to as a "Display List". The Display List defines the various parameters, data comments, etc. that represent the portion of the overall physical display space occupied by the associated display element 18. Each of the Display Lists stored in the associated memories 28 are connected to a main central processing unit (CPU) 30 through separate interconnects 32. It should be noted that each of the interconnects 32 is separately and independently connected to the CPU 30 and capable of operating asynchronously and carrying the same or different amounts of update information, and also operating at different information rates.

In operation, the CPU 30 is operable to perform all of the necessary processing functions in accordance with program instructions stored in a memory 33. The CPU 30 is a distributed processing system such that it has the capability of generating multiple display outputs that, although, operating asynchronously, can occur at substantially the same time in a simultaneous fashion. Further, the display information rate increases, and also the display bandwidth, as the number of display elements 18 increase, since the number of display interconnects 32 also increases. This is to be compared with a processor based system that only has one data connection to provide all of the display data associated with updating the display. With these systems, a portion of the processing time must be dedicated to this operation. With the system of the present invention, each display element 18 that is added to the system has associated therewith an independent display interconnect 32 with the CPU 30 such that no decrease in display bandwidth is necessary to update the Display Lists.

Figure 4:
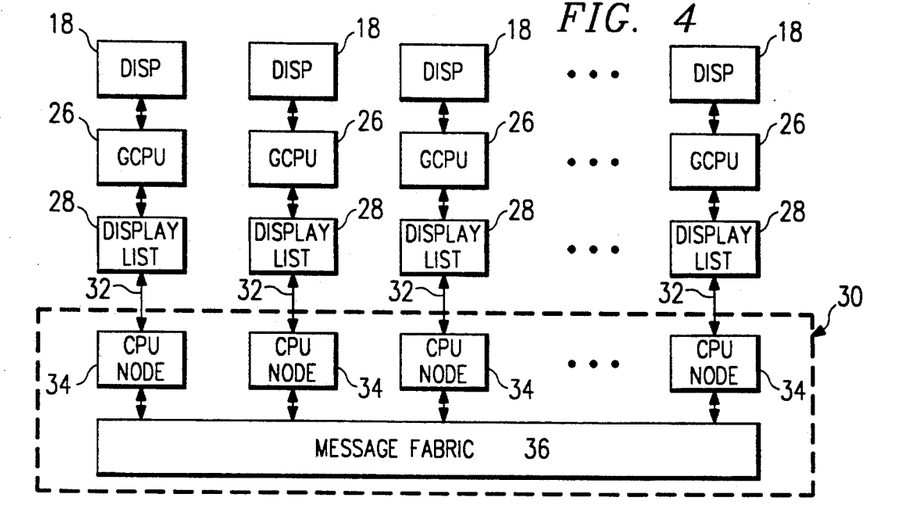
FIG. 4 illustrates a more detailed block diagram of the system of FIG. 3 illustrating the message fabric interconnecting the various processing nodes.

Referring now to FIG. 4, there is illustrated a more detailed diagram of the system of the present invention. Each of the display elements 18 is associated with one of a the tiles 10. As such, each of the display elements 18 and its associated tile has associated therewith a CPU node 34. Each of the CPU nodes 34 when interconnected together, comprise the CPU 30. The interconnection is made through a message fabric 36. When the system is initialized, each of the CPU nodes 34 recognizes whether it exists alone in CPU 30 or how many nodes exist in the CPU 30. This is essentially a parallel processing system that can utilize any of the known conventional systems.

In the preferred embodiment, an object-oriented, general purpose language is utilized for the parallel processing system. The general system that is utilized is described in K. Stuart Smith, et al., "Experimental Systems Project at MCC, March, 1989", MCC Technical Report Number: ACA-ESP-089-89 (Mar. 2, 1989), K. Stuart Smith and A. Chatterjee "A C++Environment for Distributed Application Execution", MCC Technical Report: ACT-ESP-275-90, (Sep. 4, 1990), both of which are incorporated herein by reference. In general, object-oriented languages provide for message passing, data/method encapsulation, data abstraction and inheritance. The general approach is to program implementation in a serial environment to enhance the modularity, reliability and re-usability of code. An object-oriented approach to programming forces the user to concentrate on the design of an application by identifying the relevant structures in the problem. After the data structure (classes) are identified, the programmer identifies a set of functions (methods) which access the data. Access of the data items through methods makes the formats of the data structures transparent to either classes in the system. Action in an object-oriented environment is initiated by sending "logical messages" between objects.

Data/method encapsulation in the object-oriented programming is the essence of object-orientation. A class is a set of private data values and the methods that operate that data. An object is an instantiation of a class. Other objects may communicate with the object by passing messages between explicitly defined methods. Message passing may be thought of as a combination of message sending and procedure calls. This idea is also referred to as method invocation. Because each object is a separate entity, communication takes the form of messages that are sent between objects. Since different classes can have objects of the same names, it is necessary to specify function and the associated class name.

By utilizing a distributed system, the overall operating system is split into small functional parts, each subsystem handling an independent facet of the overall system and each contributing a distinct service. Therefore, each part becomes small and manageable, and may be designed independent of other components as well as the underlying system hardware. Each processing node offers both the basic service of a processing node and also offers the ability to operate in a higher layer above these basic services. The basic services are those of gaining access to such operations as low-level I/O, etc. The processing node enables configuration of a modular operating system wherein each node possess the minimum subset of the functionality required for this operation. Once the CPUs 34 are combined in a distributed operating system, they preserve the illusion of an uniprocessor environment for the user.

The message fabric 36 that is utilized to interconnect the various CPU nodes 34 is conventional and it generally provides a physical connection for the CPU nodes 34. The message fabric is independent of the interconnections 32 that communicate with the Display List 28, GCPU 26 and display element 18. Therefore, on one side of the CPU node 34, the side of the message fabric 36, the processing function is carried out. However, on the other side of the CPU node 34, the display list 28 associated therewith is updated. It is important to note that in the preferred embodiment of the CPU 30 of FIG. 3, and the parallel processing system utilized, each of the CPU nodes 34 operates as a part of the parallel processing system. Only the processing time of a particular one of the CPU nodes 34 is utilized to update the Display Lists 28. The system can be configured such that all of the updating is achieved by utilizing the processing time of the CPU node 34 or it can be as illustrated in FIG. 4 by utilizing a separate graphics CPU 26. In this manner, multiple Display Lists 28 can be updated in a parallel manner as opposed to the prior art systems which utilize one serial output for routing data to a display list which then is divided up among multiple displays.

Although the system of FIG. 4 has been illustrated with a separate CPU node 34 for each of the display elements 18, it should be understood that there can be more CPU nodes 34 than there are display elements 18. The particular parallel processing system that is utilized may allow for more CPU nodes to be added on. It is only important that in the program certain CPU nodes have a display output associated therewith and the output can be recognized as being associated with a particular one of the Display Lists 28. Each of the Display Lists 28 defines the parameters associated with an associated one of the display elements 18, which display element 18 occupies a predetermined portion of the physical display space. Therefore, each of the Display Lists 28 is unique in its association with that particular portion of the physical display space. It is the existence of multiple outputs for a parallel processing system, with each output being driven by a separate processing node that provides the increased display bandwidth and scalability factor.

Figure 5:
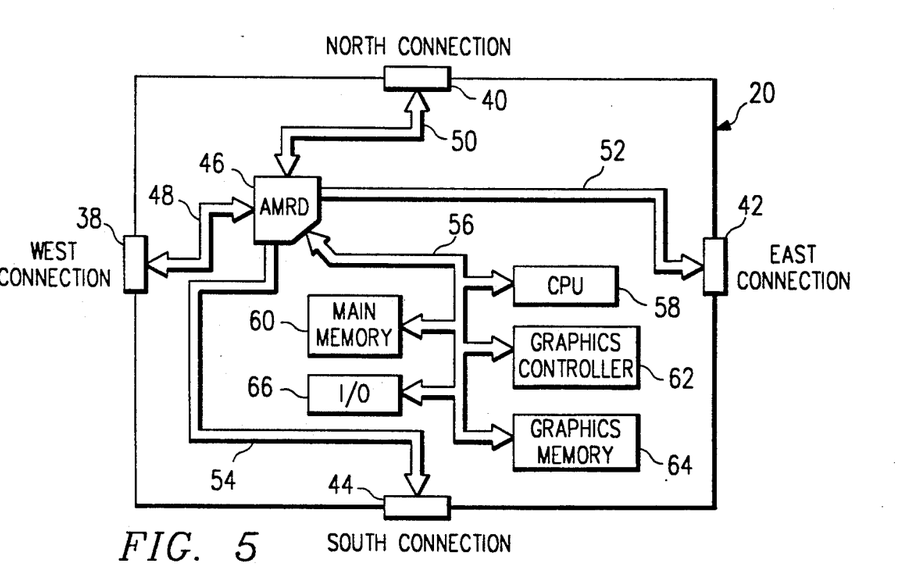
FIG. 5 illustrates a block diagram of the processing portion of one of the scalable tiles of the present invention.

Referring now to FIG. 5, there is illustrated a detailed layout of the processing portion 20 of the tile 10. In the preferred embodiment, as described above, each of the tiles 10 is configured as a square or rectangle, the square configuration illustrated in FIG. 5. The square configuration is utilized in a physical display space that corresponds to an x-y coordinant system. Each of the processing portions 20 and its associated tiles 10 has associated therewith four connectors, a west connector 38, a north connector 40, an east connector 42 and a south connector 44. A central Automated Message Routing Device (AMRD) 46 is provided on each of the processing sections 20. The AMRD 46 is connected to the west connector 38 by a system bus 48, to the north connector 40 by a system bus 50, to the east connector 42 by a system bus 52, and to the south connector 44 by a system bus 54. In addition, an internal system bus 56 is provided that is interconnected to an internal CPU 58, a main memory 60, a graphics controller 62 and a graphics memory 64. The AMRD 46 provides the heart of the message fabric 36, this being a conventional part.

One possible implementation of the AMRD is described in Guy S. Caldwell, "88K Message Interface Module Design Notes", ESP Technical Memo #46 (Oct. 31, 1988), which is incorporated herein by reference. The AMRD was developed by Symult Systems, Inc., formerly a division of Ametek, Inc. The AMRD implements 10 byte-wide ports for the two-dimensional fabric and two for the optional attachment on the local node. Each port is composed of eight data lines, a tail or end-of-message line and two handshake control lines which asynchronously time data transmission. State Machines in the AMRD implement the message protocol which includes decrementing and stripping of x- and y-header displacements, priority arbitration at each message half intersection, and insertion and extraction of messages at source and destination nodes.

The CPU 58 interfaces through the internal system bus 56 with the main memory 60 to run the program. The program stored in the main memory 60 is sufficient to allow the CPU 58 to operate the associated display element 18 (not shown) as a single display that occupies the entire physical display space or as a portion of the physical display space wherein the CPU 58 would occupy one of the plurality of processing nodes in a parallel processing system. This type of program is conventional and is described above. Therefore, the CPU 58 and its associated programs stored in the memory 60 in association with the AMRD 46 facilitates a scalable processing system. It is only necessary to initialize the system wherein each CPU 58 and each of the tiles 10 would be able to determine the portion of the physical display space with which it is associated and also its existence in a parallel processing system.

The graphics controller 62 is provided for interfacing with the graphics memory 64. The graphics memory 64 corresponds to the Display List 28 in FIGS. 3 and 4. The CPU 58 interfaces with the graphics memory 64 to store data therein associated with the display list that defines the associated display space. The purpose of the graphics controller 62 is to allow the CPU 58 to dedicate its processing time to running the program. An I/O 66 is provided that is interfaced with the system bus to output data to the display element 18 (not shown).

Figure 6:
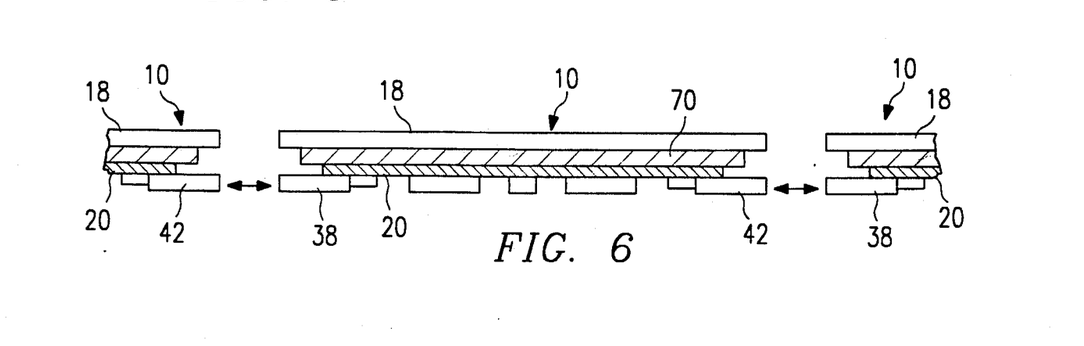
FIG. 6 illustrates a cross sectional view of the structure of one of the tiles of the present invention and the interconnection scheme.

Referring now to FIG. 6, there is illustrated a sectional view of the tile 10 illustrating a complete tile and two partial tiles interfaced therewith on either side. The east connector 42 on the central one of the tiles 10 is interfaced with the west connector 38 on the adjacent tile and, similarly, the east connector 42 on the central tile 10 is interfaced with the west connector 38 on the next adjacent tile. When the tiles are disposed in an adjacent relationship, the displays 18 abut each other to form what appears to be a single continuous display. However, each segment is controlled by the processing unit 20.

The processing unit 20 and the display are both mounted together on a substrate 70, the display 18 disposed on one side of the substrate 70 and the processing unit 20 disposed on the opposite side. The processing section 20 is comprised of a circuit board or the like that holds the interconnecting circuitry and also the components that make up the processor 20. In addition, the connectors 38-44 are mounted onto the processor portion 20 and affixed such that when interconnected with connectors on adjacent tiles, they form the abutting relationship with the display elements 18. Each of the connectors 38-44 are either a male or a female configuration such that the west connector 38 on any given board will always mate with the east connector 42 on any other board. Similarly, the south connector 44 will always mate with the north connector 40. Therefore, the connectors 38 and 42 are opposite type connectors and the connectors 40 and 44 are opposite type connectors. When a tile is disposed on the edge of a display, the exposed connector can either have a load disposed thereon or, alternately, a cap.

Figures 7, 8:
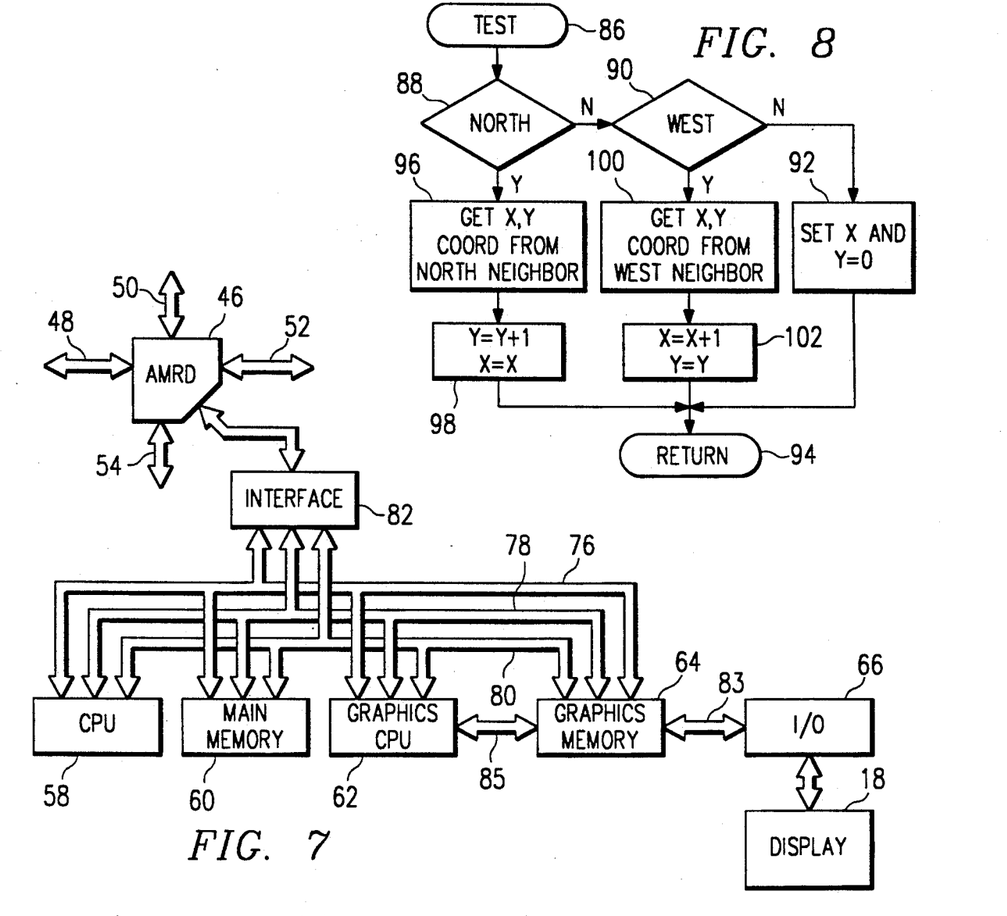
FIG. 7 illustrates a detailed schematic block diagram of the processing portion of the tiles.
FIG. 8 illustrates a flow chart for generating the coordinates for the system.

Referring now to FIG. 7, there is illustrated a more detailed diagram of the processing section 20. The system bus 56 is comprised of a control bus 76, an address bus 78 and a data bus 80. The main memory 60 interfaces with all three of the buses 76-80, as well as the graphics controller 62. The graphics memory is illustrated as being interfaced with the three buses 76-80 in one mode. However, the graphics memory 64 typically would utilize a dual port memory that would have one port dedicated for outputting data to the display element 18 through I/O 66 and an interconnecting bus network 83 and the second port for receiving updated information. In this manner, throughput is enhanced. In this mode, the graphics controller 62 would control the updating of information to the display element 18 through a control bus 85. The operation of the graphics controller 62, graphics memory 64 and I/O 66 is conventional and can utilize any configuration.

An alternate display update configuration could utilize a single memory and single central processing unit for both processing and display update wherein the memory is operable to store in a portion thereof the Display List. This central processing unit would then dedicate a predetermined portion of its processing time to outputting data through the display element 18. However, this has been found to be inefficient in previous architectures and, as such, some separate co-processor or the such would be utilized with a separate graphics memory, as illustrated in FIG. 7. This type of system is preferable in that it increases throughput.

The system bus 56 is configured with general microprocessor architecture. However, the system bus 56 is interfaced with the AMRD through an interface circuit 82. The interface circuit 82 is a conventional interface circuit that is utilized to interface between a general microprocessor structure and the AMRD 46. The interface circuit 82 is generally described in Guy Caldwell, "A Programmable Interface for ES-Kit", K. Stewart, et al, "Experimental Systems Project at MCC, March, 1989", supra, pages 19–25. The interface utilizes a thirty two-bit RISC Processor, which processes with maximum efficiency while obtaining the highest instruction execution rate. The interface includes a self contained instruction memory and data memory.

In operation, the AMRD 46 for each of the tiles 10 has a coordinant value that it recognizes through the associated CPU 58. The message fabric is designed such that a signal received on any of the buses 48–54 by the AMRD 46 will be examined to determine if it is directed toward the particular CPU 58 associated therewith. This is determined by the position of the tile 10 within the coordinant system. This is defined as an x-y value. The message is typically sent from one node to another by placing a message header on the data and determining how many columns and rows that the desired recipient node is disposed therefrom. In this manner, a given CPU can send instructions out through its associated AMRD on a select one of the ports. If the recipient node is three rows removed and four columns removed from the transmitting node, information will be contained in a header indicating that the data must be transmitted at one port, for example that associated with columns, and each associated AMRD with the nodes in the adjacent columns will examine the values to determine if it is the recipient node. For example, if it were indicated that the recipient node was three columns and four rows removed from the transmitting node, the first node in the column direction would examine the header and determine that it is not designated for that node, since the value is not 0,0. This node would then decrement the column value and hand-off the message and associated data to the next node in the next column. This would continue until the column value was zero. At that value, the row value would still be greater than zero and this would indicate transmitting it down (or up) the rows of nodes. This would continue in the same manner with each row receiving a row value greater than zero decrementing that value and handing it off to the next adjacent node in the next adjacent row. When the value was 0,0, this would indicate that the message was designated for that node. AMRD 46 associated with that node would then transmit the information out through the interface 22 to the associated CPU 58. This constitutes the message fabric 36.

The message fabric 36 is generally a two-dimensional rectangular array of intersecting message paths to which computational nodes are attached. Each path (including the path to each node) is unidirectional, thus allowing up to four independent input/output path pairs to be active at the same time. Each message transmitted through the message fabric has two prepended bytes: an x-displacement and a y-displacement. These specify the relative off site location in the mesh of the destination node. Each message traverses an L-shaped path through the message fabric 36, as determined by the header byte pair. Messages are inserted into the fabric in the x-direction. As a message is received and retransmitted at each intersection, the leading byte is decremented (or incremented if the offset is negative). When a message is received with an x-offset of 0, the message is turned into the y-direction as soon as the path is available. When a message is received with a y-offset of 0, it is directed out of the message fabric to the local node. This protocol allows a node to send a message to itself, and requires that the message fabric be rectangular.

Referring now to FIG. 8, there is illustrated a flow chart for determining the coordinant position of a given tile 10. Upon initialization, each tile goes into a test mode, indicated by a test start block 86. The program then proceeds to a decision block 88 to determine if there is a tile connected to the north connector, i.e., a north neighbor. If there is no north neighbor, this would indicate that the tile 10 was disposed on the upper border, as indicated by the program flowing along an "N" path. This path would then lead to a decision block 90 to determine if there was a neighbor to the west and connect it to the west connector. If not, this would indicate that this tile is disposed in the upper left hand corner of the display and the program would flow along the "N" path to a function block 92 to set the value for the x- and y-coordinants equal to zero, indicating the upper left hand corner. The program would then flow to a return block 94.

If decision block 88 determined that there was a north neighbor, the program would flow to a function block 96 to get the x- and y-coordinants from the north neighbor. Of course, if the north neighbor had not determined its coordinants, this particular tile 10 would have to wait until the coordinants were determined. Of course, this would be essentially a ripple effect wherein the upper left hand corner tile 10 would determine its coordinants and then ripple this information down through the remainder. When the x- and y-coordinants exist in the north neighbor, the program flows to the function block 98 to increment the value of "y" of the north neighbor's coordinant values and to set the x-value in the present tile to that of its present north neighbor. The program then flows to return block 94.

If it has been determined that there was no north neighbor but there was a west neighbor, the program would flow from a decision block 90 along the "Y" path to a function block 100 to get the x- and y-coordinants from the west neighbor. The value of "x" for the west neighbor would then be increased by a value of one for the present tile and the value of "y" is set equal to the y-value for west neighbor as indicated by function block 102. The program would then flow to the return block 94.

Once initialized, the CPU 58 in a particular one of the tiles 10 has a frame of reference defining its associated portion of the physical display space, i.e., that portion of the space which is occupied by the associated display 18. Once this is known, the program that operates in the parallel processing system can direct the particular CPU associated with that display space to update the associated Display List. However, it should be understood that the Display List is merely connected to the parallel processing system and does not necessarily have to be controlled by the associated CPU 58. Rather, messages could be received by the associated AMRD that were directed toward the graphics memory 64 that contains the Display List. In this manner, any node could update the display list at an associated node. However, it is important that processing power in the system be distributed such that the Display Lists in the various nodes are updated in an asynchronous manner, the graphics controller 62 is then operable to provide the actual output and update of the display element 18. The important aspect is that the Display Lists have independent paths from the processing system, which paths could be synchronous, but also could be asynchronous. It is conceivable that two Display Lists would be updated at the same time. Thus, providing an increase in display bandwidth and throughput.

Figure 9:
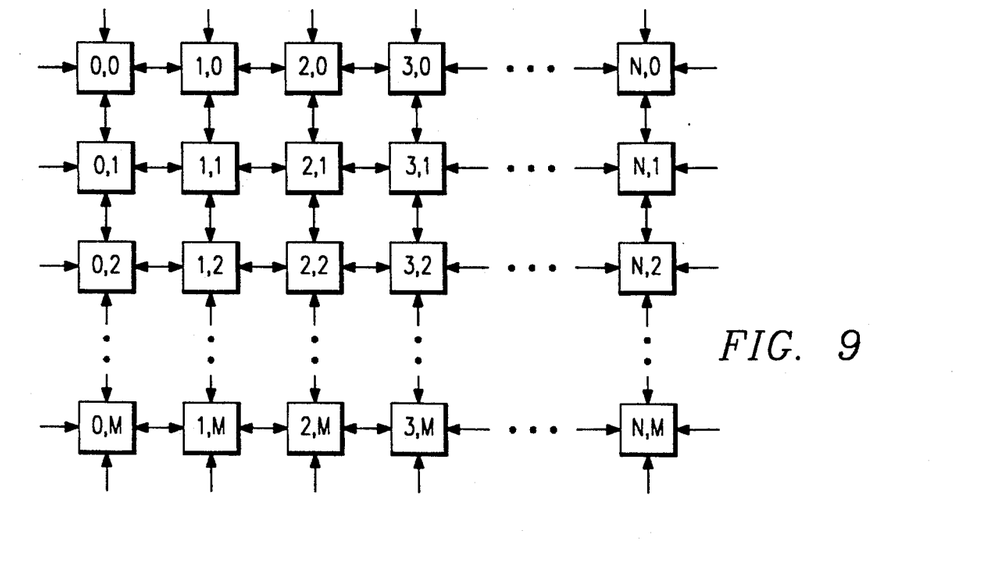
FIG. 9 illustrates a matrix of tiles.

Referring now to FIG. 9, there is illustrated a matrix of tiles, with each tile designated by its column and rows. The upper left hand column has a designation 0,0 with the lower right hand corner having a designation N,M, there being N columns and M rows. If, for example, the tile 10 at position 0,1 desired to send information to the tile 10 at position 3,2, it would code in the message header information indicating a progression of three tiles to the right and one tile down. This would be sent to the tile in position 1,1 which would recognize the code as not being intended for it, and would decrement the number of columns to the right. This would continue until it reached the tile 3,1. At this point, the column value would be 0 and the row value would be 1. This would indicate to the tile 10 at position 3,1 to pass the message through the south port to the next adjacent row and also decrement the row value. At the tile at position 3,2, both the row value and column value would be zero, indicating that tile as being the recipient tile.

Although an x-y coordinant system has been described, there is no reason that the entire x-y coordinant space be filled but, rather, only a defined physical display space be provided. The display could even be arranged on the inside of a cylinder, or it could be the tiles in a diagonal that would define the physical display space. It is only important that each tile recognize its physical location within the physical display space, be that display space one-dimensional, two-dimensional or three-dimensional, and that each of the displays be interconnected with a CPU network that provides a separate output for each tile or each portion of the display space defined thereby. In this manner, the number of tiles that are added to the system do not diminish the display bandwidth.

In the preferred embodiment, the display space occupies a physical set of coordinates. When additional tiles are added, this physical size changes. Depending upon the program, the actual output can either be "scaled" such that the overall virtual display space remains the same or, alternatively, the physical display space can be increased with a corresponding increase in the virtual display space. For example, one could envision a scene that occupied four tiles in a two-by-two configuration. Additional tiles could be added that would define the space as being four tiles wide by two tiles deep. Rather than scale up the scene, additional scenery could be provided. This would be akin to taking photographs in a panoramic view with the original scene defined in the first four tiles with the additional tiles added merely increasing the size of the physical display space without increasing the space of the original scene.

In summary, there has been provided a scalable visualization system that allows scaling of a display space to increase the physical coordinants thereof without decreasing the display bandwidth. Further, scaling of the physical display space also has associated therewith a scaling of the computing power. The computing power is scaled by continually adding to a parallel processing system additional processing nodes.

Although the preferred embodiment has been described in detail, it should be understood that various changes, substitutions and alterations can be made therein without departing from the spirit and scope of the invention as defined by the appended claims.

What is claimed is:

1. A scalable visualization system, comprising:

a physical display space for defining the boundaries of an area in which an image can be displayed;

a plurality of display elements, each of said display elements associated with a predetermined portion of said physical display space and each of said display elements form receiving display information at a predetermined information rate;

a central processing unit for executing instructions with a predetermined processing power to generate said display information for each of said display elements to be displayed in said physical display space; and a plurality of display control means, each associated with one of said display elements and each for receiving the display information at substantially said predetermined information rate for said associated display element from said central processing unit and transmitting the received display information to said associated display element at said predetermined information rate.

2. The visualization system of claim 1, wherein said predetermined information rate of each of said display elements is independent of the predetermined information rate of the other of said display elements.

3. The visualization system of claim 1, wherein said display control means for each of said display elements is operable to receive display information for said associated one of said display elements asynchronous relative to the predetermined information rate provided to each of the other ones of said display elements.

4. The visualization system of claim 1, wherein each of said display control means comprises:

a storage element for storing said associated received display information as a display list, said display list defining the parameters for mapping of said associated display information onto the associated predetermined portion of said physical display space;

a graphics controller for mapping said display list to said associated display element and to the associated predetermined portion of said physical display space; and update means for updating said display list at a rate at least equal to said predetermined information rate, said central processing unit operable to generate said display information at a rate at least equal to the rate at which said update means updates said display lists on said associated storage element.

5. The visualization system of claim 1, wherein said central processing unit comprises a parallel processing unit having a plurality of processing nodes operating in conjunction with each other to provide said predetermined processing power and generate said display information, wherein each of said display control means is associated with at least one of said processing nodes, said one of said processing nodes operable to generate said display information for the one of said display control means and the one of said display elements associated with said processing mode.

6. The visualization system of claim 5, wherein said physical display space is scalable by the addition of additional ones of said display elements and associated ones of display control means such that an increase in said physical display space corresponds to an increase in the generation of display information by said central processing unit.

7. The visualization system of claim 6, and further comprising means for increasing the processing power of said central processing unit in accordance with an increase in said physical display space by the addition of said display elements and associated ones of said display control means.

8. The visualization system of claim 1, wherein said physical display space is scalable by the addition of additional ones of said display elements and associated ones of display control means such that an increase in said physical display space corresponds to an increase in the amount of display information generated by said central processing unit.

9. The visualization system of claim 8, and further comprising means for increasing the processing power of said central processing unit corresponding to the increase in said physical display space by the addition of said display elements and associated ones of the said display control means.

10. A scalable visualization system, comprising:
a physical display space;
a plurality of display elements, each of said display elements associated with a predetermined portion of said physical display space and for receiving display information at a predetermined information rate;
a parallel processing system for executing instructions with a predetermined processing power to generate said display information, said parallel processing system having a plurality of processing nodes, at least one of said processing nodes associated with each of said display elements, said associated processing nodes generating said display information for the associated ones of said display elements;
a plurality of display controllers, each associated with one of said display elements and each having:
a storage element for storing the portion of said display information for said associated display element as a display list, said display list defining the parameters of the mapping of the associated portion of said display information onto the associated portion of said physical display space,
a graphics controller for mapping said display list to said associated display element, and
update means for interfacing with said associated processing node for updating said display list at a rate at least equal to said associated predetermined information rate; and
wherein said parallel processing system is operable to generate said processing information for all of said display elements at a rate at least equal to or greater than the rate at which said update means updates said display list for each of said display elements.

11. The visualization system of claim 10, wherein the rate at which said update means updates each of said display lists as controlled by said associated processing node is independent of the rate at which said update means for the remaining ones of said display elements updates said associated display lists.

12. The visualization system of claim 10, wherein the rate at which said update means updates said associated display list for said associated display elements operates asynchronously relative to the rate at which the other of said update means updates said associated display list for the remaining ones of said display elements.

13. The visualization system of claim 10, wherein said physical display space is scalable by the addition of additional ones of said display elements and associated ones of said display controllers such that an increase in said physical display space corresponds to an increase in the rate at which said display information is generated by said parallel processing system.

14. The visualization system of claim 13, and further comprising, at least an additional one of said processing nodes associated with each of said additional display elements and associated display controllers and means for incorporating said additional one of said processing nodes into said parallel processing system such that the processing power of said parallel processing system is scaled up for an increase in said physical space system by the addition of said additional display element.

15. A scalable element for a scalable visualization system that maps display information into a physical display space, comprising:
a supporting surface defining a portion of the physical display space having associated therewith a portion of the display information;
a display element associated with and disposed on said supporting surface for displaying the portion of the display information corresponding to the portion of said physical display space associated with said supporting surface;
a processing node disposed on said supporting surface, having:
a program memory for storing program instructions,
a display memory for storing a display list defining the parameters of the associated portion of the display information that maps into the associated portion of the physical display space, and
a processor for executing program instructions and operable to execute said program instructions as a unit or as a part of a parallel processing system, said processor operable to generate in accordance with said program instructions the associated portion of said display information and update said display list stored in said display memory in accordance with said generated portion of said display information, said processor operable to update said display list at a predetermined information rate;
an interconnection network for interconnecting said processing node to other processing nodes in a parallel processing network and for being part of a message network between said other processing nodes in a parallel processing system; and
a graphics controller for mapping said display list to said display element;
wherein updating of said display list by said processor occurs at said predetermined information rate when said processor is configured in a parallel processing system, said predetermined information rate not affected by the addition of other salable elements that define the overall physical display space.

16. The scalable element of claim 15, wherein said processing node is disposed on the opposite side of said support surface from said display element.

17. The scalable element of claim 15, wherein said display element is rectangular in shape and the physical display space is defined by x- and y-coordinates in an x-y coordinate space.

18. The scalable element of claim 15, wherein said interconnection network further defines a physical location of said display element in the physical display space as well as a logical location of said processing node in a parallel processing system.

19. A method for forming a visual display within a physical display space, comprising the steps of:
providing a plurality of display elements;
associating each of the display elements with a predetermined portion of the physical display space;
receiving at each of the display elements associated display information which is part of a total display information at a predetermined display information rate;
providing a central processing unit;
executing instructions at the central processing unit at a predetermined processing power to generate the associated display information for each of the display elements, the associated display information displayed in the physical display space; and
receiving the associated display information from the central processing unit at substantially the predetermined display information rate for each of the associated display elements and transmitting the received associated display information to the associated display element at the associated predetermined display information rate for each of the display elements.

20. The method of claim 19 wherein the predetermined display information rate for each of the display elements is independent of the associated display information that is written to the other of the display elements.

21. The method of claim 19, wherein each of the display elements is operable to receive the associated display information asynchronously relative to the predetermined display information rate provided to each of the other ones of the display elements.

22. The method of claim 19 wherein the step of providing the central processing unit comprises:
providing a plurality of processing nodes interconnected to form a parallel processing unit;
associating each of the display elements with a separate one of the processing nodes; and
generating at the one of the processing nodes for each of the display elements the associated display information at the predetermined display information rate for the associated display element.

23. The method of claim 22 and further comprising adding additional ones of the display elements to ones of the processing nodes to which display elements are not associated with to thereby increase the physical display space, the increase in physical display space corresponding to an increase in generation of associated display information by the central processing unit.

24. The method of claim 23 and further comprising increasing the processing power of the central processing unit in accordance with the increase in the physical display space by the addition of the display elements.

* * * * *

UNITED STATES PATENT AND TRADEMARK OFFICE
CERTIFICATE OF CORRECTION

PATENT NO. : 5,321,505

DATED : June 14, 1994

INVENTOR(S) : William J. Leddy

It is certified that error appears in the above-indentified patent and that said Letters Patent is hereby corrected as shown below:

Column 12, Claim 1, line 6, replace "form" with --for--.

Signed and Sealed this

Fourth Day of April, 1995

Attest:

BRUCE LEHMAN

Attesting Officer

Commissioner of Patents and Trademarks